United States Patent Office 3,087,878
Patented Apr. 30, 1963

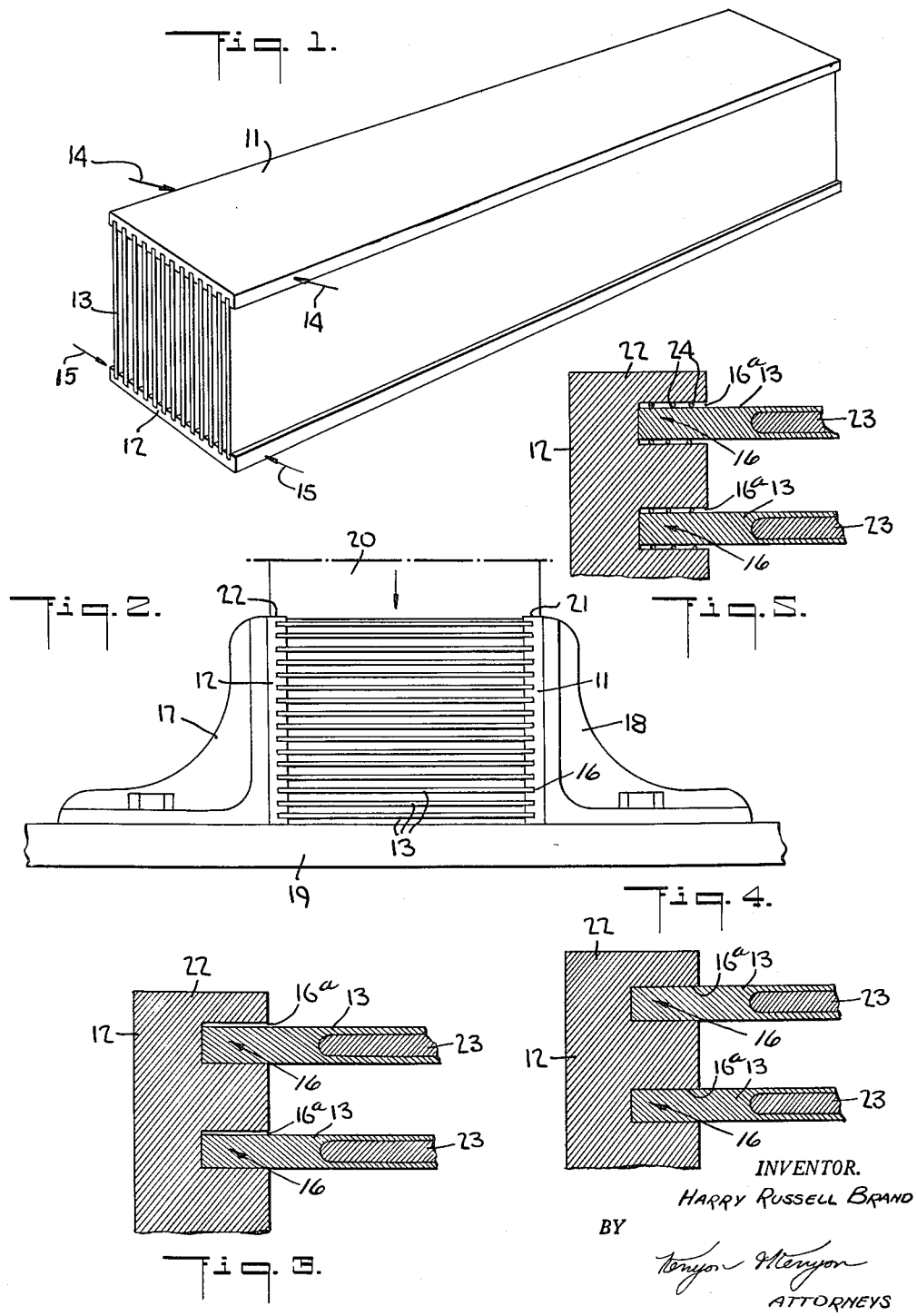

3,087,878
NUCLEAR FUEL ELEMENT ASSEMBLY AND
METHOD OF FABRICATING SAME
Harry Russell Brand, Hicksville, N.Y., assignor, by mesne assignments, to Sylvania Electric Products Inc., a corporation of Delaware
Filed Mar. 23, 1959, Ser. No. 801,038
2 Claims. (Cl. 204—154.2)

This invention relates to nuclear fuel element assemblies and similar girder-type structures and to a method for fabricating such assemblies and structures out of separate component parts.

In forming nuclear fuel element assemblies having a plurality of supporting or terminal plates joined by one or more cross plates containing the nuclear fuel there is difficulty in anchoring the cross plates to the terminal plates so as to obtain proper support, heat conductivity, and non-interference with the nuclear reaction. According to the present invention such a structure is formed by the process of laying the cross plates in preformed slots in the terminal plates and permanently uniting the assembly by simultaneously closing the slots upon the edges of the cross plates by pressure exerted against the edges of the terminal plates.

This process and the structure thus formed have advantages over prior art processes and structures in the ease with which the structure is fabricated and in the mechanical quality of the joints between the terminal plates and the cross plates, as well as on the improved characteristics of such joints and the assembly containing them when employed in a reactor.

The invention will be further described with reference to the drawing in which:

FIG. 1 shows a perspective view of a nuclear fuel assembly fabricated according to the invention;

FIG. 2 shows a step in the fabricating process of the assembly in FIG. 1;

FIG. 3 shows an enlarged cross sectional view of a portion of the assembly immediately prior to the completion of the step in FIG. 2;

FIG. 4 shows a cross section of the same part of the assembly as FIG. 3 after the step in FIG. 2, and FIG. 5 shows a modification of the assembly in FIG. 3.

In FIG. 1 the nuclear fuel assembly shown comprises a pair of terminal plates 11 and 12 joined by a plurality of cross plates 13 containing the nuclear fuel. In the embodiment shown both the terminal plates and the cross plates are flat but it is not necessary that the structure be limited to plates of this shape. One surface of each of the terminal plates 11 and 12 is slotted and the cross plates 13 fit into these slots and are anchored therein by pressure exerted on the edges of the terminal plates 11 and 12 in the direction of the arrows 14 and 15.

The process of anchoring the cross plates 13 in place is shown in FIG. 2. After the slots 16 are formed in the terminal plates 11 and 12, these plates are placed between a pair of back-up dies 17 and 18 having a height substantially equal to the width of the plates 11 and 12. These dies are mounted on a base 19, and the cross plates 13 are slipped into place in the slots in the terminal plates. Thereafter a punch 20 is pushed downward as by hydraulic pressure to bear against the upper edges 21 and 22 of the plates 11 and 12, respectively. It has been found that a pressure of approximately 5 tons per inch of the length of the plates 11 and 12 is sufficient to compress aluminum terminal plates 11 and 12 of the size commonly used in nuclear fuel elements sufficiently to anchor the cross plates in place. The strength of the bond between the cross plates 13 and the terminal plates 11 and 12 may be increased by cleaning the interlocking surfaces with a caustic solution just prior to assembly.

The process of assembling the terminal plates and cross plates is very much simplified over processes that have been followed heretofore because of the fact that in the present method of assembly there is a loose fit between the slots of the terminal plates and the cross plates. FIG. 3 is an enlarged cross sectional view showing that the slots 16 have a greater width than the thickness of the cross plates 13. The extra space in the width of the slots may be, for example, approximately .007" for satisfactory results. This allows the plates 13 to be slipped into place easily and rapidly.

After pressure has been exerted on the edges of the terminal plates, these plates are deformed enough to close the slots 16, as shown in FIG. 4. The pressure exerted on the edges of the terminal plates 11 and 12 appears to change the structure of these plates by producing a cold flow of the metal, resulting in a unitary, rigid structure by forcing the sides 16a of the slots 16 into direct, intimate contact with the enclosed edges of the plates 13 so as to anchor these plates firmly in place. In this way a structure of high torsional strength can be fabricated. This structure is suitable for other structural uses in addition to its use as a nuclear fuel element. For example, the structure in FIG. 1 could be used as a wing spar or floor beam in an aircraft frame or in any other type of framework where the strength of a box girder is required.

In a nuclear fuel element, the cross plates 13 consist of a relatively hard radioactive core 23 encased, or clad, in a jacket of relatively soft material, such as aluminum. For ease of fabrication and for best thermal results, the terminal plates 11 and 12 may also be made of the same soft material with which the relatively hard radioactive cores 23 are clad.

It may in some cases be desirable to increase the strength of the force anchoring the cross plates 13 to the terminal plates 11 and 12. For this purpose anchoring means may be inserted between facing portions of the edges of the plates 13 and the terminal plates as indicated in FIG. 5, which shows the same portion of the overall structure as is shown in FIGS. 3 and 4. One suitable form of anchoring means, as shown in FIG. 5, consists of crystals 24 of relatively hard material such as Carborundum or alumina or berillia dust on the edges of the plates 13 within the slots 16 in the terminal plate 12. When the terminal plate 12 is thereafter subjected to pressure, as indicated in FIG. 2 and as described hereinabove, the crystalline particles 24 bite into the relatively soft material of the terminal plates 12 and the cross plates 13 and greatly increase the holding power that keeps the cross plates 13 anchored in place.

While the invention has been described in terms of a single embodiment, it will be recognized by those skilled in the art that other similar structures, and particularly nuclear fuel elements of various designs, may be formed according to the invention as it is defined in the following claims.

What is claimed is:

1. The process of forming a nuclear fuel element comprising a pair of terminal plates and a plurality of nuclear fuel cross plates, said process comprising the steps of forming a plurality of slots in one surface of each of said terminal plates, said slots being slightly wider than the thickness of the edges of said cross plates; inserting each of said cross plates into opposing slots of said terminal plates; interposing locking means between the sides of said slots and the facing portions of the surfaces of said cross plates, said locking means being appreciably harder than said fuel plates and terminal plates; and exerting a pressure on the edges of said terminal plate sufficient to close each of said slots upon the edge of the cross plate embraced within it and to embed said locking means to anchor all of said cross plates in said terminal plates.

2. The process according to claim 1, wherein a granular substance appreciably harder than said fuel plates and terminal plates is interposed therebetween before pressure is interposed to close said slots upon said cross plates to embed said granular material.

References Cited in the file of this patent

UNITED STATES PATENTS

| | | |
|---|---|---|
| 164,379 | Kloman | June 15, 1875 |
| 2,236,180 | Kost | Mar. 25, 1941 |
| 2,813,073 | Saller et al. | Nov. 12, 1957 |
| 2,831,806 | Wigner | Apr. 22, 1958 |
| 2,853,446 | Abbott et al. | Sept. 23, 1958 |
| 2,947,678 | Gimera et al. | Aug. 2, 1960 |
| 2,981,673 | Johnson | Apr. 25, 1961 |

OTHER REFERENCES

TID-7559 (Part I), Fuel Elements Conference, May 18, 1958, pp. 48, 49, and 51.